US012583413B2

(12) United States Patent
Kitamura et al.

(10) Patent No.: US 12,583,413 B2
(45) Date of Patent: Mar. 24, 2026

(54) THREE-DIMENSIONAL AIR BAG

(71) Applicant: TOYODA GOSEI CO., LTD., Kiyosu (JP)

(72) Inventors: Daisuke Kitamura, Aichi-ken (JP); Akira Yamashita, Aichi-ken (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/064,947

(22) Filed: Feb. 27, 2025

(65) Prior Publication Data

US 2025/0282319 A1     Sep. 11, 2025

(30) Foreign Application Priority Data

Mar. 5, 2024     (JP) ................................. 2024-033418

(51) Int. Cl.
B60R 21/231     (2011.01)
B60R 21/205     (2011.01)
B60R 21/235     (2006.01)

(52) U.S. Cl.
CPC .......... B60R 21/235 (2013.01); B60R 21/205 (2013.01); B60R 21/231 (2013.01); B60R 2021/23538 (2013.01); B60R 2021/23576 (2013.01)

(58) Field of Classification Search
CPC ... B60R 21/231; B60R 21/235; B60R 21/205; B60R 2021/23576; B60R 2021/23533; B60R 2021/23538; B60R 2021/23571

USPC ........................ 280/728.1, 743.1, 743.2, 732
See application file for complete search history.

(56) References Cited

U.S. PATENT DOCUMENTS

| | | | | |
|---|---|---|---|---|
| 2002/0020998 | A1* | 2/2002 | Keshavaraj | B60R 21/231 280/743.1 |
| 2012/0098242 | A1* | 4/2012 | Aranzulla | B60R 21/231 280/743.1 |
| 2024/0286574 | A1* | 8/2024 | Abe | B60R 21/235 |
| 2025/0042353 | A1* | 2/2025 | Miura | B60R 21/231 |

FOREIGN PATENT DOCUMENTS

| | | | | | |
|---|---|---|---|---|---|
| EP | 4169776 | B1 | * | 7/2025 | |
| JP | 2008013162 | A | * | 1/2008 | |
| JP | 2015-016840 | A | | 1/2015 | |
| JP | 2018020737 | A | * | 2/2018 | |
| WO | WO-2007055234 | A1 | * | 5/2007 | B60R 21/231 |
| WO | WO-2023228690 | A1 | * | 11/2023 | B60R 21/203 |

* cited by examiner

*Primary Examiner* — Keith J Frisby
(74) *Attorney, Agent, or Firm* — Posz Law Group, PLC

(57) ABSTRACT

A three-dimensional air bag includes a first three-dimensional sewn portion, a second three-dimensional sewn portion and a flat sewn portion as defined herein, a shape of the first three-dimensional sewn portion in the main panel in a flat state is different from a shape of the first three-dimensional sewn portion in the first side panel in a flat state, a shape of the second three-dimensional sewn portion in the main panel in the flat state is different from a shape of the second three-dimensional sewn portion in the second side panel in a flat state, and a shape of the flat sewn portion in the first side panel in the flat state and a shape of the flat sewn portion in the second side panel in the flat state are the same.

3 Claims, 6 Drawing Sheets

PRIOR ART

PRIOR ART

PRIOR ART

PRIOR ART

THREE-DIMENSIONAL AIR BAG

CROSS-REFERENCE TO RELATED APPLICATION

This application is based on and claims priority under 35 USC 119 from Japanese Patent Application No. 2024-033418 filed on Mar. 5, 2024.

TECHNICAL FIELD

The present invention relates to an air bag mounted on a vehicle and deployed and inflated when an impact occurs.

BACKGROUND ART

Various types of air bag devices are known in which, when an impact occurs such as during a vehicle collision or sudden braking, an inflation fluid such as gas generated by an inflation fluid generation source such as an inflator is supplied to an air bag connected to the inflation fluid generation source, and the air bag is deployed and inflated between a vehicle body and an occupant to protect the occupant.

The air bag in an air bag device preferably has a three-dimensional sack shape because the air bag is required to be deployed and inflated. A three-dimensional sack-shaped air bag, that is, a three-dimensional air bag made by sewing together a plurality of panels, has been proposed (see, for example, Patent Literature 1).

In the three-dimensional air bag in which the plurality of panels are sewn together as introduced in Patent Literature 1, a plurality of portions for sewing the panels (hereinafter referred to as sewn portions as necessary) are formed.

PATENT LITERATURE

Patent Literature 1: JP2015-16840A

SUMMARY OF INVENTION

As one type of three-dimensional air bag, for example, as shown in FIG. 3, an air bag in which a long main panel 902 and a pair of side panels (first side panel 903 and second side panel 904) are sewn together is described.

In this type of three-dimensional air bag 901, the main panel 902 is sandwiched between the pair of side panels 903 and 904 that are spaced apart from each other. Further, the three-dimensional air bag 901 is formed by sewing two long sides of the main panel 902 to outer peripheries of the side panels 903 and 904.

In the three-dimensional air bag 901 illustrated in FIG. 3, the main panel 902 functions as a gusset fabric between the pair of side panels 903 and 904. Accordingly, the three-dimensional air bag 901 is three-dimensional in a distance direction of the pair of side panels 903 and 904. Further, the three-dimensional air bag 901 has gently curved surfaces that correspond to outer peripheral shapes of the pair of side panels 903 and 904.

The three-dimensional air bag 901 shown in FIG. 3 has the gently curved surfaces facing a vehicle interior structure having relatively low strength, such as a windshield, and an occupant. Due to a shape thereof, the curved surfaces impart less load to the vehicle interior structure and the occupant with which the curved surfaces come into strong contact when an impact occurs, making it advantageous as surfaces of the three-dimensional air bag 901 that face the vehicle interior structure and the occupant.

The three-dimensional air bag 901 shown in FIG. 3 includes a first sewn portion 911 where the main panel 902 and the first side panel 903 are sewn together, and a second sewn portion 912 where the main panel 902 and the second side panel 904 are sewn together. The first sewn portion 911 and the second sewn portion 912 are formed with the gentle curved surfaces corresponding to the outer peripheral shapes of the pair of side panels 903 and 904.

FIG. 4 shows panels in a state before being sewn together with other panels. Each panel shown in FIG. 4 may also be referred to as a panel of the air bag with seams unstitched. Each panel is a flat piece of fabric, and is sewn together to form a three-dimensional air bag having a three-dimensional sack shape.

In this specification, a state of the panel is referred to as a flat state.

As shown in FIG. 4, a shape of the first sewn portion 911 in the main panel 902 in the flat state is different from a shape of the first sewn portion 911 in the first side panel 903 in the flat state. A shape of the second sewn portion 912 in the main panel 902 in the flat state and a shape of the second sewn portion 912 in the second side panel 904 in the flat state are also different.

Such first sewn portion 911 and second sewn portion 912 are advantageous in forming the above-mentioned gently curved surfaces.

However, on the other hand, in a case in which the main panel 902 and the first side panel 903 are sewn together, it is necessary to perform sewing by causing the first sewn portion 911 of the main panel 902 and the first sewn portion 911 of the first side panel 903 to gradually overlap with each other, while aligning shapes of the long side of the main panel 902 with the outer periphery of the first side panel 903.

Similarly, in a case in which the main panel 902 and the second side panel 904 are sewn together, it is necessary to perform sewing by causing the second sewn portion 912 of the main panel 902 and the second sewn portion 912 of the second side panel 904 to gradually overlap with each other, while aligning shapes of the long side of the main panel 902 and the outer periphery of the second side panel 904.

Such work is very complicated, and therefore, manufacturing defects are likely to occur. Furthermore, by such a sewing method, it is difficult to form a complex uneven shape having a series of fine curves.

Hereinafter, in the present specification, this type of sewing style is sometimes called three-dimensional sewing.

As another type of three-dimensional air bag 901, for example, as shown in FIG. 5, an air bag in which a short main panel 902 and a pair of side panels (first side panel 903 and second side panel 904) are sewn together is described.

In this type of three-dimensional air bag 901, predetermined portions of outer peripheries of the pair of side panels 903 and 904 are spaced apart from each other, and the main panel 902 is sandwiched therebetween. Other predetermined portions of the outer peripheries of the pair of side panels 903 and 904 face each other. Further, another predetermined portion of the outer periphery of each of the side panels 903 and 904 faces another predetermined region of the outer periphery of the respective one of the side panels 903 or 904.

Furthermore, two long sides of the main panel 902 are sewn to partial regions of the outer peripheries of the side panels 903 and 904, respectively, the pair of side panels 903 and 904 are sewn to each other, and a part of the outer periphery of each of the side panel 903 and the side panel 904 is sewn to another part of the same one, thereby forming the three-dimensional air bag 901.

In the three-dimensional air bag 901 illustrated in FIG. 5, the main panel 902 functions as a gusset fabric between the pair of side panels 903 and 904, and a part of the outer periphery of each of the side panels 903 and 904 is sewn to the other part of the same one to form the three-dimensional air bag.

The three-dimensional air bag 901 illustrated in FIG. 5 includes a first sewn portion 911 where the main panel 902 and the first side panel 903 are sewn together, a second sewn portion 912 where the main panel 902 and the second side panel 904 are sewn together, a third sewn portion 913 where the first side panel 903 and the second side panel 904 are sewn together, a fourth sewn portion 914 where the first side panel 903 itself is sewn, and a fifth sewn portion 915 where the second side panel 904 itself is sewn.

FIG. 6 shows panels in a flat state.

As shown in FIG. 6, a shape of the first sewn portion 911 in the main panel 902 in the flat state is the same as a shape of the first sewn portion 911 in the first side panel 903 in the flat state. A shape of the second sewn portion 912 in the main panel 902 in the flat state and a shape of the second sewn portion 912 in the second side panel 904 in the flat state are also the same.

A shape of the third sewn portion 913 in the first side panel 903 in the flat state and a shape of the third sewn portion 913 in the second side panel 904 in the flat state are also the same. The two fourth sewn portions 914 in the first side panel 903 in the flat state also have the same shape, and the two fifth sewn portions 915 in the second side panel 904 in the flat state also have the same shape.

Therefore, when the main panel 902 and the first side panel 903 are sewn together to form the first sewn portion 911, the long side of the main panel 902 and a part of the outer periphery of the first side panel 903, which have the same shape, are simply overlapped and sewn together. Such a first sewn portion 911 can be easily formed even if the first sewn portion 911 has a relatively complicated shape, such as a series of curved lines.

The same applies to a case in which the second sewn portion 912 is formed by sewing the main panel 902 and the second side panel 904 together, a case in which the third sewn portion 913 is formed by sewing the first side panel 903 and the second side panel 904 together, a case in which the fourth sewn portion 914 is formed by sewing the first side panel 903, and a case in which the fifth sewn portion 115 is formed by sewing the second side panel 904.

The above-mentioned work is relatively easy and has the advantage that manufacturing defects are unlikely to occur.

On the other hand, the three-dimensional air bag 901 shown in FIG. 5 has many sewn portions, and the sewn portions are distributed over the entire three-dimensional air bag 901. Since the sewn portions are more rigid than other portions, a three-dimensional air bag having many sewn portions has a high overall rigidity, and therefore exerts a large reaction force on the vehicle interior structure and the occupant when the three-dimensional air bag deploys and inflates. Therefore, this type of three-dimensional air bag requires careful consideration of a placement position and an internal structure, which results in poor versatility.

Further, in this type of three-dimensional air bag, each of the first and second side panels in which a part is required to be sewn to itself, has a complex and large shape, which results in lower yield.

Hereinafter, in the present specification, this type of sewing style is sometimes called flat sewing.

The present invention has been made in view of the above circumstances, and an object thereof is to provide a technique capable of easily manufacturing an air bag that applies a small load to an occupant and a vehicle interior structure.

An air bag according to an aspect of the present invention is a three-dimensional air bag in which a main panel, a first side panel, and a second side panel are sewn together, the air bag includes:

a first three-dimensional sewn portion in which the main panel and the first side panel are sewn together, a second three-dimensional sewn portion in which the main panel and the second side panel are sewn together, and a flat sewn portion in which the first side panel and the second side panel are sewn together, at least a part of the flat sewn portion is on a lower surface of the air bag when the air bag is deployed and inflated, at least a part of the first three-dimensional sewn portion and at least a part of the second three-dimensional sewn portion are on an upper surface of the air bag when the air bag is deployed and inflated, a shape of the first three-dimensional sewn portion in the main panel in a flat state is different from a shape of the first three-dimensional sewn portion in the first side panel in the flat state, a shape of the second three-dimensional sewn portion in the main panel in the flat state is different from a shape of the second three-dimensional sewn portion in the second side panel in the flat state, and a shape of the flat sewn portion in the first side panel in the flat state and a shape of the flat sewn portion in the second side panel in the flat state are the same.

According to the technique of the present invention, it is possible to easily manufacture an air bag that applies a small load to an occupant and a vehicle interior structure.

DESCRIPTION OF EMBODIMENTS

Figure 1:
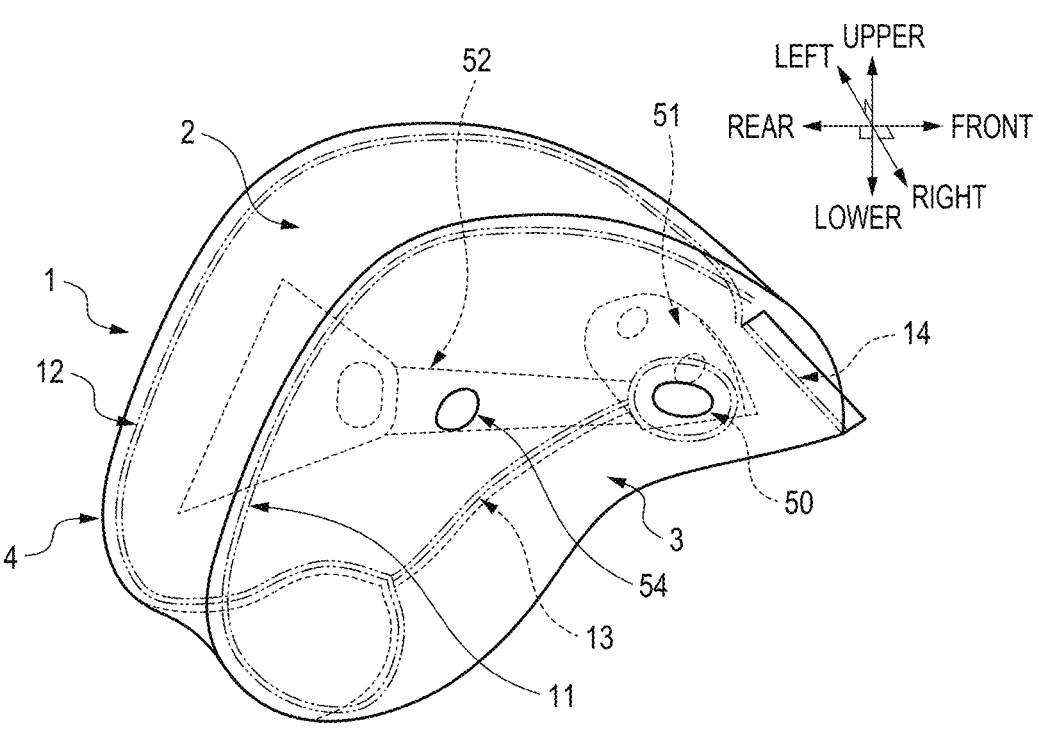
FIG. 1 is a diagram schematically illustrating a state in which a three-dimensional air bag according to a first embodiment is deployed and inflated.

A three-dimensional air bag according to the present invention is an air bag in which a main panel, a first side panel, and a second side panel are sewn together.

A three-dimensional air bag according to the present invention includes a first three-dimensional sewn portion in which the main panel and the first side panel are sewn together, a second three-dimensional sewn portion in which the main panel and the second side panel are sewn together, and a flat sewn portion in which the first side panel and the second side panel are sewn together.

A shape of the first three-dimensional sewn portion in the main panel in a flat state is different from a shape of the first three-dimensional sewn portion in the first side panel in the flat state. Further, a shape of the second three-dimensional sewn portion in the main panel in the flat state is different from a shape of the second three-dimensional sewn portion in the second side panel in the flat state. Therefore, the first three-dimensional sewn portion and the second three-dimensional sewn portion can be said to be formed by the three-dimensional sewing described above.

Further, a shape of the flat sewn portion in the first side panel in the flat state and a shape of the flat sewn portion in the second side panel in the flat state are the same. Therefore, the flat sewn portion can be said to be formed by the flat sewing already described.

The three-dimensional air bag according to the present invention is manufactured by combining the three-dimensional sewing and the flat sewing. According to such a three-dimensional air bag of the present invention, a complicated three-dimensional shape derived from the flat sewing can be easily formed by the flat sewn portion, and a gently curved surface derived from the three-dimensional sewing can be easily formed by the first three-dimensional sewn portion and the second three-dimensional sewn portion.

Here, there are various vehicle interior parts such as an instrument panel and a steering wheel below an air bag mounted on a vehicle, and these vehicle interior parts come into contact with the air bag at the time of deployment and inflation to generate a reaction force. Since the reaction force is generated with a sufficient magnitude and in a sufficient area, the air bag can stably receive the occupant or the like to be protected during the deployment and inflation.

In order to sufficiently generate the above-described reaction force, it is preferable to form a shape of a portion of the air bag facing the vehicle interior parts at the time of deployment and inflation into an uneven shape corresponding to the vehicle interior parts.

In the three-dimensional air bag according to the present invention, at least a part of the flat sewn portion is on a lower surface of the air bag at the time of deployment and inflation. Therefore, in the three-dimensional air bag according to the present invention, the lower surface of the air bag can be easily formed into a complicated three-dimensional shape corresponding to the vehicle interior parts below the air bag by the flat sewn portion. Accordingly, in the three-dimensional air bag according to the present invention, it is possible to sufficiently generate the reaction force caused by the vehicle interior parts when the air bag is deployed and inflated.

An upper surface of the air bag mounted on the vehicle faces a vehicle interior structure having relatively low strength such as a windshield or the occupant. Therefore, it is preferable that the upper surface of the air bag has a shape that applies a small load to the vehicle interior structure and the occupant when an impact occurs, and as described above, three-dimensional sewing is advantageous in forming this shape.

In the three-dimensional air bag according to the present invention, at least a part of the first three-dimensional sewn portion and at least a part of the second three-dimensional sewn portion, which are three-dimensional sewn portions, are on the upper surface of the air bag at the time of deployment and inflation. Accordingly, in the three-dimensional air bag according to the present invention, it is possible to reduce a load applied to the vehicle interior structure and the occupant when an impact occurs.

In the three-dimensional air bag according to the present invention, the flat sewn portion in which the first side panel and the second side panel are sewn together is formed by the flat sewing. That is, when the flat sewn portion is formed at the time of manufacturing the three-dimensional air bag according to the present invention, an outer periphery of the first side panel and an outer periphery of the second side panel may be simply overlapped and sewn. That is, the first side panel and the second side panel can be easily sewn together, and manufacturing defects hardly occur when the first side panel and the second side panel are sewn together.

Further, since the first side panel and the second side panel can be easily sewn together, the first side panel and the second side panel can be easily and accurately positioned. Accordingly, a work of sewing the main panel and the first side panel together to form the first sewn portion and a work of sewing the main panel and the second side panel together to form the second sewn portion become very easy.

By combining these factors, it can be said that the technique of the present invention can easily manufacture an air bag that applies a small load to the occupant and the vehicle interior structure.

Hereinafter, the three-dimensional air bag according to the present invention will be described for each component thereof. Hereinafter, unless otherwise specified, the air bag means a three-dimensional air bag.

In the following description, front, rear, upper, and lower refer to the front, rear, upper, and lower of an air bag mounted in a vehicle and deployed and inflated, and in this regard, front refers to a front side in a forward direction of the vehicle, and rear refers to a front side in a reverse direction of the vehicle. Upper and lower refer to an upper-lower direction of the vehicle, in other words, upper and lower in a vertical direction.

Unless otherwise specified, a numerical range "x to y" described in the present specification includes a lower limit value x and an upper limit value y. The upper limit value, the lower limit value, and numerical values listed in the embodiments may be freely combined to form a new numerical value range. Further, a numerical value freely selected from the above-described numerical value range can be set as an upper limit numerical value or a lower limit numerical value of a new numerical value range.

An air bag according to the present invention is an air bag in which a main panel, a first side panel, and a second side panel are sewn together.

The main panel, the first side panel, and the second side panel may have different shapes, but the first side panel and the second side panel may have the same shape. If the first side panel and the second side panel have the same shape, the same pattern can be used for both the first side panel and the second side panel, which is advantageous in terms of cost. Further, by using one panel as both the first side panel and the second side panel, there is also the advantage that the number of steps required for cutting the first side panel and the second side panel is reduced.

The main panel, the first side panel, and the second side panel may be made of the same material or different materials. Materials for the main panel, the first side panel, the second side panel, and a thread used for sewing these panels, that is, materials for the air bag, will be described in detail later.

The air bag according to the present invention includes a first three-dimensional sewn portion in which the main panel and the first side panel are sewn together, a second three-dimensional sewn portion in which the main panel and the second side panel are sewn together, and a flat sewn portion in which the first side panel and the second side panel are sewn together.

The first three-dimensional sewn portion, the second three-dimensional sewn portion, and the flat sewn portion are portions where the corresponding panels are sewn together, and each can be said to have a linear shape.

In a flat state of each panel, each of these sewn portions may be imaginary lines. Alternatively, indication lines may be written on the panels in the flat state at positions corresponding to these sewn portions.

In the air bag according to the present invention, at least a part of the flat sewn portion is on a lower surface of the air bag at the time of deployment and inflation. Further, at least a part of the first three-dimensional sewn portion and at least a part of the second three-dimensional sewn portion are on an upper surface of the air bag at the time of deployment and inflation.

In the present specification, the lower surface of the air bag refers to a surface of the air bag at the time of deployment and inflation, and means an area that is located on a lower side when the air bag is vertically divided into two equal parts. Further, the upper surface of the air bag refers to a surface of the air bag at the time of deployment and inflation, and means an area that is located on an upper side when the air bag is vertically divided into two equal parts. A front surface of the air bag refers to a surface of the air bag at the time of deployment and inflation, and means an area that is located on a front side when the air bag is divided into two equal parts in a front-rear direction. Further, a rear surface of the air bag refers to a surface of the air bag at the time of deployment and inflation, and means an area that is located on a rear side when the air bag is divided into two equal parts in the front-rear direction.

As described above, in the air bag according to the present invention, the flat sewn portion is located in a position that faces vehicle interior parts such as an instrument panel and a steering wheel when the air bag is deployed and inflated. At least a part of such a flat sewn portion may be on the lower surface of the air bag at the time of deployment and inflation and may be entirely on the lower surface of the air bag at the time of deployment and inflation. Further, in consideration of a positional relationship between the air bag and the vehicle interior parts mounted in a vehicle cabin, it is also preferable that at least a part of the flat sewn portion is located on the lower surface and the front surface of the air bag at the time of deployment and inflation.

On the other hand, in the air bag according to the present invention, the three-dimensional sewn portion is located at a position facing the occupant at the time of deployment and inflation. Therefore, at least a part of the first three-dimensional sewn portion and at least a part of the second three-dimensional sewn portion may be on the upper surface of the air bag at the time of deployment and inflation, and the entirety of the first three-dimensional sewn portion and the second three-dimensional sewn portion may be on the upper surface of the air bag at the time of deployment and inflation. Further, in consideration of a positional relationship between the air bag and a seat mounted in the vehicle cabin, it is also preferable that at least a part of the first three-dimensional sewn portion and at least a part of the second three-dimensional sewn portion are located on the upper surface and the rear surface of the air bag at the time of deployment and inflation.

In the present specification, the lower surface of the air bag refers to the surface of the air bag at the time of deployment and inflation, and means the area that is located on the lower side when the air bag is vertically divided into two equal parts. Further, the upper surface of the air bag refers to the surface of the air bag at the time of deployment and inflation, and means the area that is located on the upper side when the air bag is vertically divided into two equal parts. The front surface of the air bag refers to the surface of the air bag at the time of deployment and inflation, and means the area that is located on the front side when the air bag is divided into two equal parts in the front-rear direction. Further, the rear surface of the air bag refers to the surface of the air bag at the time of deployment and inflation, and means the area that is located on the rear side when the air bag is divided into two equal parts in the front-rear direction.

In the air bag according to the present invention, a shape of the first three-dimensional sewn portion in the main panel in the flat state is different from a shape of the first three-dimensional sewn portion in the first side panel in the flat state, and the shapes are not particularly limited.

Similarly, a shape of the second three-dimensional sewn portion in the main panel in the flat state is different from a shape of the second three-dimensional sewn portion in the second side panel in the flat state, and the shapes are not particularly limited.

Further, a shape of the flat sewn portion in the first side panel in the flat state and a shape of the flat sewn portion in the second side panel in the flat state are the same, and the shapes are not particularly limited.

However, when the first side panel and the second side panel have the same shape as described above, it is preferable that the shape of the first three-dimensional sewn portion in the first side panel in the flat state and the shape of the second three-dimensional sewn portion in the second side panel in a flat state are the same.

At this time, it is preferable that the shape of the first three-dimensional sewn portion in the main panel in the flat state and the shape of the second three-dimensional sewn portion in the main panel in the flat state are the same.

In this case, it is preferable that the main panel in the flat state has a line-symmetrical shape with a midline between the first three-dimensional sewn portion and the second three-dimensional sewn portion as an axis of symmetry.

The air bag according to the present invention may have only the first three-dimensional sewn portion, the second three-dimensional sewn portion, and the flat sewn portion described above as the sewn portions, but may include other sewn portions in addition thereto.

The air bag according to the present invention preferably includes, as the other sewn portion, an overlapped sewn portion in which a part of the main panel, a part of the first side panel, and a part of the second side panel are overlapped and sewn together, for example.

When the air bag according to the present invention includes the overlapped sewn portion, it is preferable that a shape of the overlapped sewn portion in the main panel in the flat state, a shape of the overlapped sewn portion in the first side panel in the flat state, and a shape of the overlapped sewn portion in the second side panel in the flat state are the same. In other words, the overlapped sewn portion is preferably a flat sewn portion.

By using the flat sewn portion as the overlapped sewn portion, the main panel, the first side panel, and the second side panel can be easily sewn to close an outer periphery of the air bag, and the sack-shaped air bag can be easily formed.

The overlapped sewn portion is a portion having relatively high rigidity, in which a part of the main panel, a part of the first side panel, and a part of the second side panel are overlapped and sewn together. Therefore, it is preferable that at least a part of the overlapped sewn portion is located away from the occupant, specifically, on the front surface of the air bag at the time of deployment and inflation. It is also preferable that at least a part of the overlapped sewn portion is located on the front surface and the lower surface of the air bag at the time of deployment and inflation.

The air bag according to the present invention has a hollow sack shape and is mounted on a vehicle to protect the occupant when an impact caused by a collision occurs. The air bag may be disposed in any portion of the vehicle, and as described above, it is particularly preferable that the air bag is mounted on a steering wheel or mounted on a portion of a back surface side of an instrument panel positioned in front of a passenger seat, and is interposed between the occupant and a windshield.

The air bag according to the present invention is connected to an inflation fluid generation source, and is deployed and inflated by being supplied with an inflation fluid when an impact occurs, but is folded and stored in a normal state. Therefore, as a material of the air bag, it is preferable to select a material that can be folded and deployed. As a specific material of the air bag, a flexible and high-strength material is preferably selected, and for example, a woven fabric using a high-strength resin fiber such as polyester and polyamide can be particularly preferably used.

The air bag according to the present invention may also include an open vent hole and an opening and closing mechanism for opening and closing the vent hole. By providing the air bag with the vent hole, the inflation fluid supplied to an inside of the air bag can be discharged to an outside through the vent hole, thereby reducing an internal pressure of the air bag. Further, the internal pressure of the air bag can be appropriately adjusted by opening and closing the open vent hole provided in the air bag using the opening and closing mechanism.

The present invention can also be understood as an invention of an air bag device that includes the inflation fluid generation source that supplies the inflation fluid to the air bag, in addition to the air bag according to the present invention described above.

The inflation fluid generation source in the air bag device preferably uses an inflator that generates gas as the inflation fluid, and in some cases, the inflation fluid generation source may generate an inflation fluid other than gas, for example, liquid or gel.

The inflation fluid generation source may be a device that supplies the inflation fluid to the air bag, and may be, for example, a pyrotechnic type device including a gas generating agent that generates gas as the inflation fluid or a hybrid type device in which a partition wall of a high-pressure container is broken and gas contained in the high-pressure container is supplied. The inflation fluid generation source may be entirely disposed outside the air bag, or may be partially or entirely disposed inside the air bag.

The air bag device may include other components. Examples of the other components include a retainer that accommodates at least a part of the inflation fluid generation source, a cover that surrounds at least a part of the air bag, a wire harness for electrically connecting the inflation fluid generation source and an air bag control device, and an opening and closing mechanism for opening and closing a vent hole, but the air bag device is not limited thereto, and may include other components.

Hereinafter, the air bag according to the present invention will be described with reference to examples.

First Embodiment

An air bag according to a first embodiment is a passenger seat air bag that is mounted on a rear side of an instrument panel of a vehicle and in front of a passenger seat.

Figure 2:
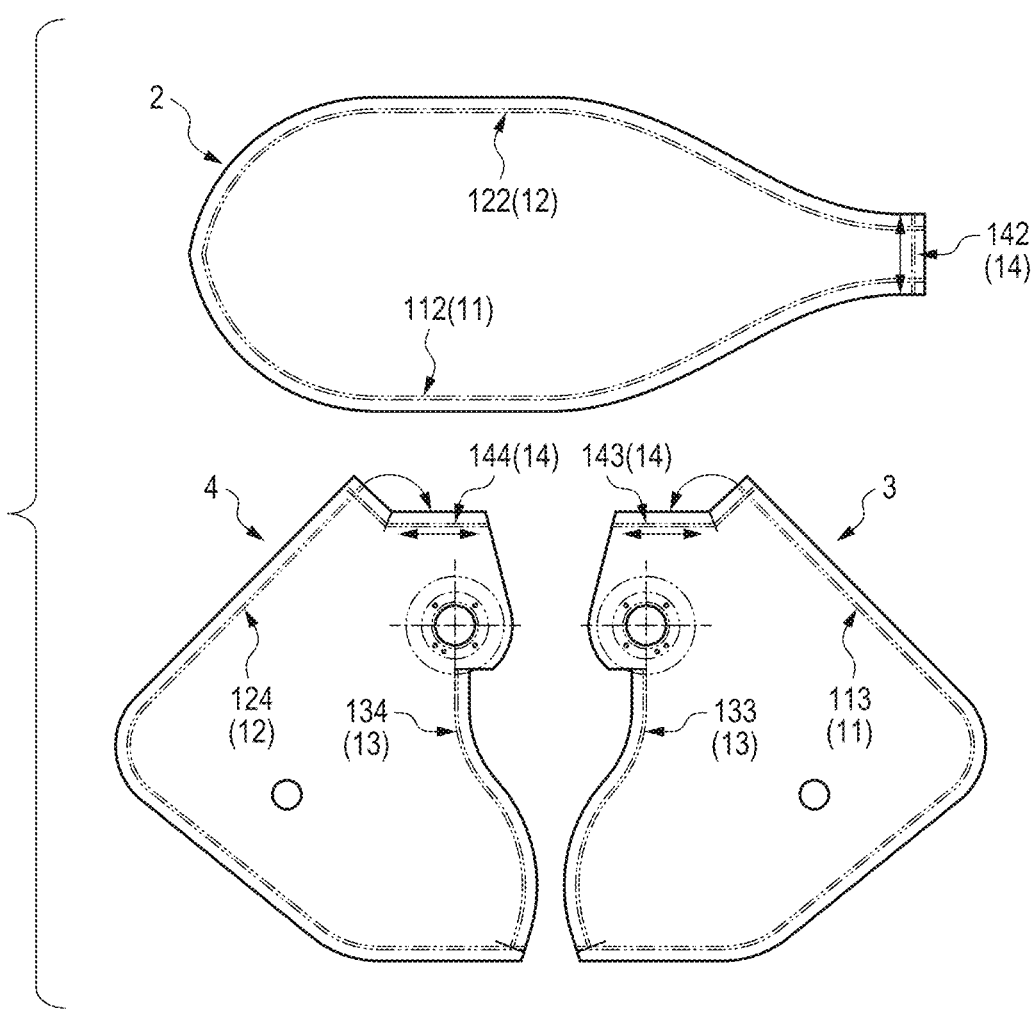
FIG. 2 is a diagram schematically illustrating a main panel, a first side panel, and a second side panel in the three-dimensional air bag according to the first embodiment.
Figure 3:
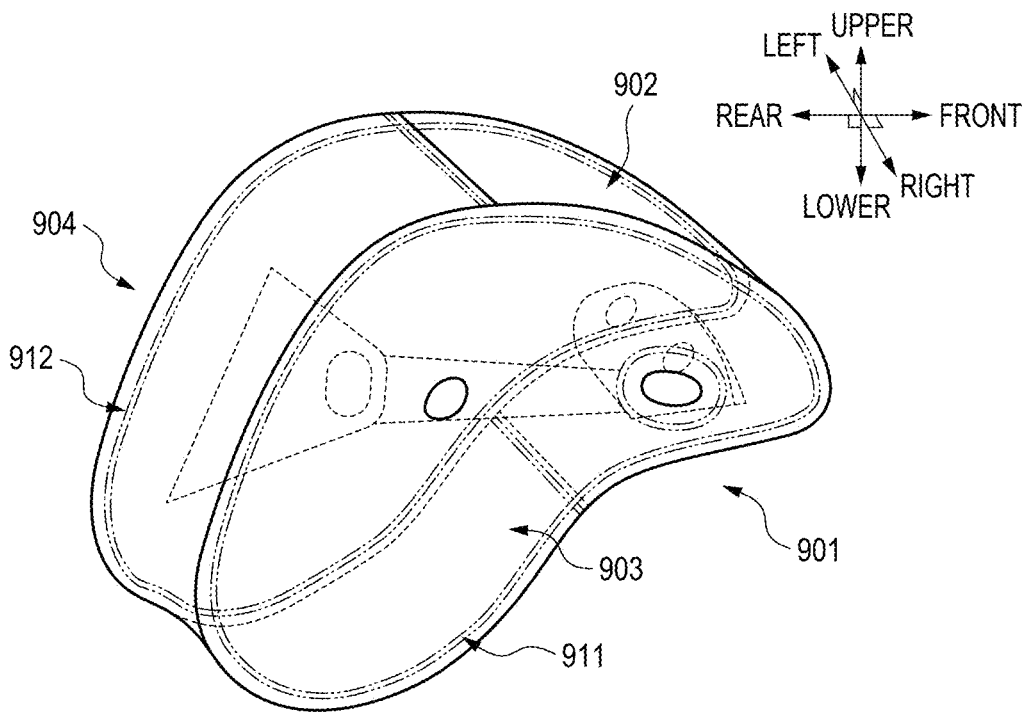
FIG. 3 is a diagram schematically illustrating an example of a conventional three-dimensional air bag in the related art.
Figure 4:
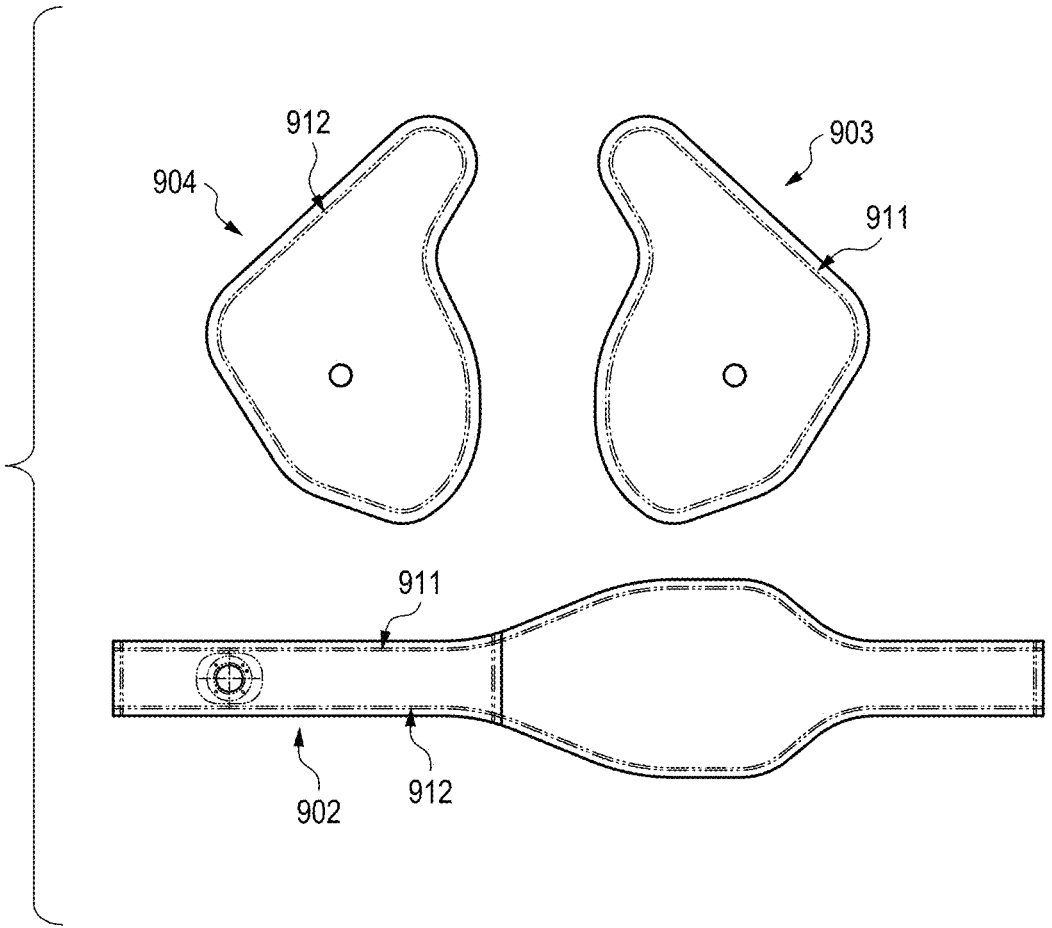
FIG. 4 is a diagram illustrating sewn portions in the example of the three-dimensional air bag in the related art.
Figure 5:
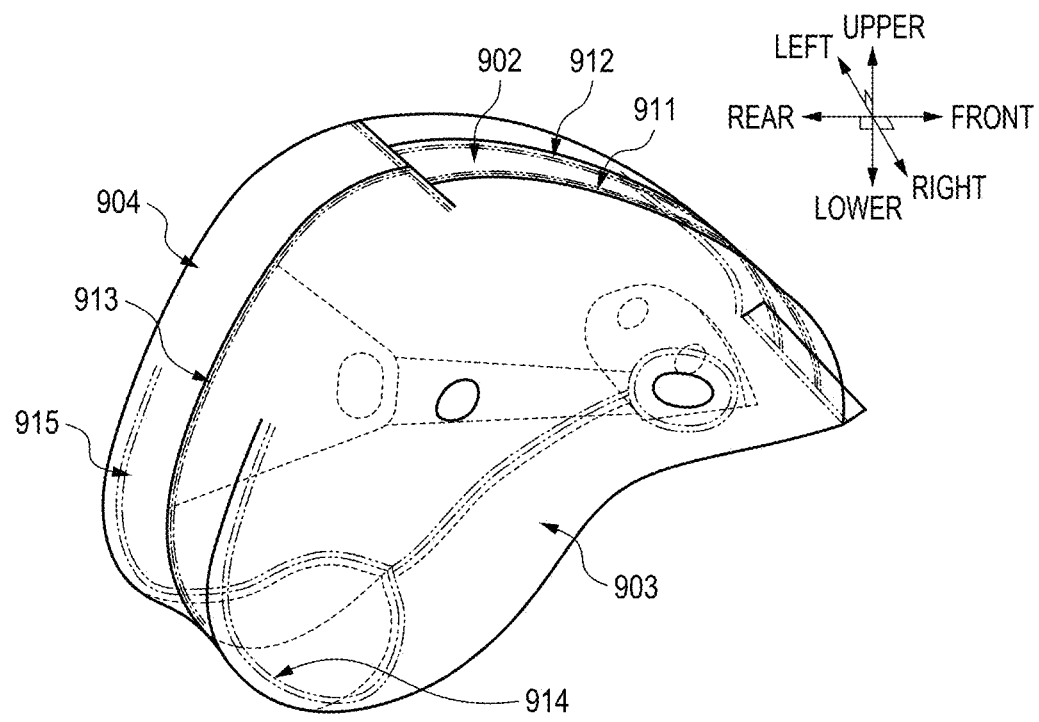
FIG. 5 is a diagram schematically illustrating another example of the three-dimensional air bag in the related art.
Figure 6:
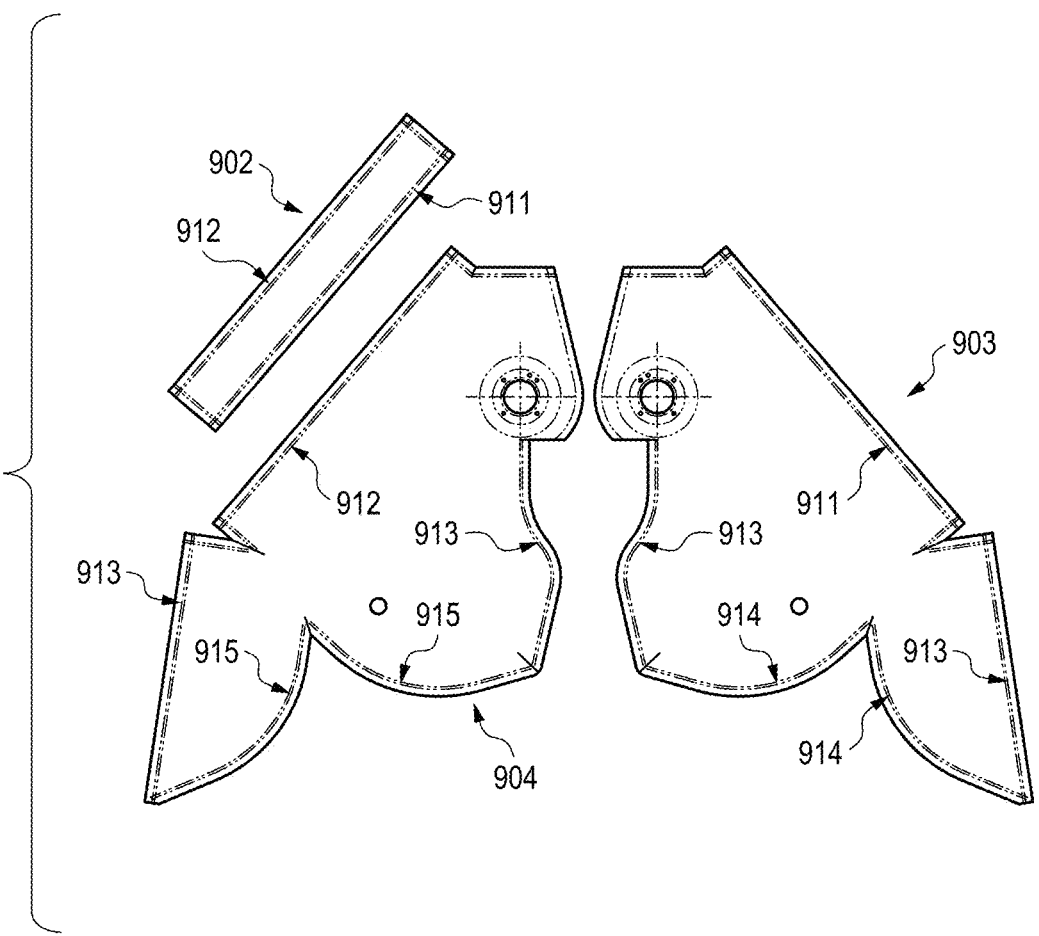
FIG. 6 is a diagram illustrating sewn portions in the other example of the three-dimensional air bag in the related art.

FIG. 1 shows a diagram schematically illustrating a state in which the air bag according to the first embodiment is deployed and inflated. FIG. 2 shows a diagram schematically illustrating a main panel, a first side panel, and a second side panel in the air bag according to the first embodiment.

As shown in FIG. 1, an air bag 1 according to the first embodiment is formed by sewing a main panel 2, a first side panel 3, and a second side panel 4 together.

The air bag 1 according to the first embodiment includes a first three-dimensional sewn portion 11, a second three-dimensional sewn portion 12, a flat sewn portion 13, and an overlapped sewn portion 14. These are all the sewn portions described above, that is, the portions in which the panels are sewn together.

Among the sewn portions, the first three-dimensional sewn portion 11 is a portion in which the main panel 2 and the first side panel 3 are sewn together.

The second three-dimensional sewn portion 12 is a portion in which the main panel 2 and the second side panel 4 are sewn together.

The flat sewn portion 13 is a portion in which the first side panel 3 and the second side panel 4 are sewn together.

The overlapped sewn portion 14 is a portion in which a part of the main panel 2, a part of the first side panel 3, and a part of the second side panel 4 are overlapped and sewn together.

As shown in FIG. 1, the entire flat sewn portion 13 is on the lower surface of the air bag 1 at the time of deployment and inflation. A part of the flat sewn portion 13 is on the lower surface and a front surface of the air bag 1 at the time of deployment and inflation.

Most of the first three-dimensional sewn portion 11 and most of the second three-dimensional sewn portion 12 are located on an upper surface of the air bag 1 at the time of deployment and inflation. A part of the first three-dimensional sewn portion 11 and a part of the second three-dimensional sewn portion 12 are on the upper surface and a rear surface of the air bag 1 at the time of deployment and inflation.

The entire overlapped sewn portion 14 is located on the front surface of the air bag 1 at the time of deployment and inflation. It can also be said that the entire overlapped sewn portion 14 is located on the front surface and the lower surface of the air bag 1 at the time of deployment and inflation.

As shown in FIG. 2, a shape of the first three-dimensional sewn portion 11 in the main panel 2 in the flat state is different from the shape of the first three-dimensional sewn portion 11 in the first side panel 3 in the flat state.

Hereinafter, as necessary, the first three-dimensional sewn portion 11 in the main panel 2 in the flat state is referred to as a first three-dimensional sewn intended portion 112 of the main panel 2, and the first three-dimensional sewn portion 11 in the first side panel 3 in the flat state is referred to as a first three-dimensional sewn intended portion 113 of the first side panel 3.

A shape of the second three-dimensional sewn portion 12 in the main panel 2 in the flat state is different from a shape of the second three-dimensional sewn portion 12 in the second side panel 4 in the flat state.

Hereinafter, as necessary, the second three-dimensional sewn portion 12 in the main panel 2 in the flat state is referred to as a second three-dimensional sewn intended portion 122 of the main panel 2, and the second three-dimensional sewn portion 12 in the second side panel 4 in the flat state is referred to as a second three-dimensional sewn intended portion 124 of the second side panel 4.

A shape of the flat sewn portion 13 in the first side panel 3 in the flat state and a shape of the flat sewn portion 13 in the second side panel 4 in the flat state are the same.

Hereinafter, as necessary, the flat sewn portion 13 in the first side panel 3 in the flat state is referred to as a flat sewn intended portion 133 of the first side panel 3, and the flat sewn portion 13 in the second side panel 4 in the flat state is referred to as a flat sewn intended portion 134 of the second side panel 4.

A shape of the overlapped sewn portion 14 in the main panel 2 in the flat state, a shape of the overlapped sewn portion 14 in the first side panel 3 in the flat state, and a shape of the overlapped sewn portion 14 in the second side panel 4 in the flat state are the same.

Hereinafter, as necessary, the overlapped sewn portion 14 in the main panel 2 in the flat state is referred to as an overlapped sewn intended portion 142 of the main panel 2, the overlapped sewn portion 14 in the first side panel 3 in the flat state is referred to as an overlapped sewn intended portion 143 of the first side panel 3, and the overlapped sewn portion 14 in the second side panel 4 in the flat state is referred to as an overlapped sewn intended portion 144 of the second side panel 4.

As shown in FIG. 2, the first side panel 3 in the flat state and the second side panel 4 in the flat state have the same shape. Further, the main panel 2 in the flat state has a line-symmetrical shape with a midline between the first three-dimensional sewn portion 11 and the second three-dimensional sewn portion 12, in other words, a midline between the first three-dimensional sewn intended portion 112 of the main panel 2 and the second three-dimensional sewn intended portion 122 of the main panel 2 as an axis of symmetry.

Hereinafter, a procedure for manufacturing the air bag 1 according to the first embodiment will be described.

When the air bag 1 according to the first embodiment is manufactured, first, the first side panel 3 and the second side panel 4 are overlapped and sewn together such that the flat sewn intended portion 133 of the first side panel 3 and the flat sewn intended portion 134 of the second side panel 4 overlap with each other. Accordingly, the flat sewn portion 13 in which the first side panel 3 and the second side panel 4 are sewn together is formed, and the first side panel 3 and the second side panel 4 are integrated.

Next, the first three-dimensional sewn intended portion 112 of the main panel 2 and the first three-dimensional sewn intended portion 113 of the first side panel 3 are gradually overlapped with each other and sewn together while shapes of one long side of the main panel 2 and a part of an outer periphery of the first side panel 3 are aligned with each other. Accordingly, the first three-dimensional sewn portion 11 in which the main panel 2 and the first side panel 3 are sewn together is formed, and the main panel 2, the first side panel 3, and the second side panel 4 are integrated into a three-dimensional sheet shape.

Next, the second three-dimensional sewn intended portion 122 of the main panel 2 and the second three-dimensional sewn intended portion 124 of the second side panel 4 are gradually overlapped with each other and sewn together while shapes of one long side of the main panel 2 and a part of an outer periphery of the second side panel 4 are aligned with each other. Accordingly, the second three-dimensional sewn portion 12 in which the main panel 2 and the second side panel 4 are sewn together is formed, and the main panel

2, the first side panel 3, and the second side panel 4 are integrated into a sack shape having an opened opening.

Next, a front portion of the main panel 2, a front portion of the first side panel 3, and a front portion of the second side panel 4 are overlapped and sewn together such that the overlapped sewn intended portion 142 of the main panel 2, the overlapped sewn intended portion 143 of the first side panel 3, and the overlapped sewn intended portion 144 of the second side panel 4 overlap with one another.

The overlapped sewn intended portion 144 of the first side panel 3 and the overlapped sewn intended portion 143 of the second side panel 4 are folded to have the same shape as the overlapped sewn intended portion 142 of the main panel 2 at the time of sewing.

Accordingly, the overlapped sewn portion 14 is formed in which the part of the main panel 2, the part of the first side panel 3, and the part of the second side panel 4 are overlapped and sewn together, and the main panel 2, the first side panel 3, and the second side panel 4 are integrated into a sack shape having a closed opening.

Thereafter, the air bag 1 according to the first embodiment shown in FIG. 1 is obtained by turning the air bag 1 inside out through an opening 50 provided on the lower surface of the air bag 1.

The opening 50 communicates with the inflator (not shown) and serves as an injection port for the inflation fluid from an outside toward an inside of the air bag 1.

In addition, inside the air bag 1, there are provided a flow straightening cloth 51 that controls a flow direction of the inflation fluid injected into the inside of the air bag 1 through the opening 50 when the air bag 1 is deployed and inflated, and a tether (tension cloth) 52 that prevents excessive inflation of the air bag 1 when the air bag 1 is deployed and inflated. Further, the first side panel 3 and the second side panel 4 of the air bag 1 are provided with a vent hole 54 having a through hole shape, and the air bag 1 is further provided with an opening and closing mechanism (not shown) that opens and closes the vent hole 54.

Although the present invention has been described above, the present invention is not limited to the above-described embodiments and the like, the elements described in the embodiments and the like can be appropriately extracted and combined, and various modifications can be made without departing from the scope of the present invention.

In addition, the description of the present invention is not limited to the citation relationships of claims at the beginning of the application, and discloses a technical idea obtained by appropriately combining the matters described in each claim.

REFERENCE SIGNS LIST

1 air bag (three-dimensional air bag)
2 main panel
3 first side panel
4 second side panel
11 first three-dimensional sewn portion
12 second three-dimensional sewn portion
13 flat sewn portion
14 overlapped sewn portion
What is claimed is:

1. A three-dimensional air bag in which a main panel, a first side panel, and a second side panel are sewn together, the air bag comprising:
   a first three-dimensional sewn portion in which the main panel and the first side panel are sewn together, a second three-dimensional sewn portion in which the main panel and the second side panel are sewn together, and a flat sewn portion in which the first side panel and the second side panel are sewn together, wherein at least a part of the flat sewn portion is at a lower surface of the air bag when the air bag is deployed and inflated, at least a part of the first three-dimensional sewn portion and at least a part of the second three-dimensional sewn portion are at an upper surface of the air bag when the air bag is deployed and inflated, a shape of the first three-dimensional sewn portion in the main panel in a flat state is different from a shape of the first three-dimensional sewn portion in the first side panel in a flat state, a shape of the second three-dimensional sewn portion in the main panel in the flat state is different from a shape of the second three-dimensional sewn portion in the second side panel in a flat state, a shape of the flat sewn portion in the first side panel in the flat state and a shape of the flat sewn portion in the second side panel in the flat state are the same, and the three-dimensional air bag further comprises an overlapped sewn portion in which a part of the main panel, a part of the first side panel, and a part of the second side panel are overlapped and sewn together, wherein at least a part of the overlapped sewn portion is at a front surface of the air bag when the air bag is deployed and inflated, and a shape of the overlapped sewn portion in the main panel in the flat state, a shape of the overlapped sewn portion in the first side panel in the flat state, and a shape of the overlapped sewn portion in the second side panel in the flat state are the same.

2. The three-dimensional air bag according to claim 1, wherein the main panel in the flat state has a line-symmetrical shape with a midline between the first three-dimensional sewn portion and the second three-dimensional sewn portion as an axis of symmetry.

3. A three-dimensional air bag in which a main panel, a first side panel, and a second side panel are sewn together, the air bag comprising:

a first three-dimensional sewn portion in which the main panel and the first side panel are sewn together, a second three-dimensional sewn portion in which the main panel and the second side panel are sewn together, and a flat sewn portion in which the first side panel and the second side panel are sewn together, wherein at least a part of the flat sewn portion is at a lower surface of the air bag when the air bag is deployed and inflated, at least a part of the first three-dimensional sewn portion and at least a part of the second three-dimensional sewn portion are at an upper surface of the air bag when the air bag is deployed and inflated, a shape of the first three-dimensional sewn portion in the main panel in a flat state is different from a shape of the first three-dimensional sewn portion in the first side panel in a flat state, a shape of the second three-dimensional sewn portion in the main panel in the flat state is different from a shape of the second three-dimensional sewn portion in the second side panel in a flat state, a shape of the flat sewn portion in the first side panel in the flat state and a shape of the flat sewn portion in the second side panel in the flat state are the same, and the three-dimensional air bag further comprises an overlapped sewn portion in which a part of the main panel, a part of the first side panel, and a part of the second side panel are overlapped and sewn together, wherein at least a part of the overlapped sewn portion is at a front surface of the air bag when the air bag is deployed and inflated, a shape of the overlapped sewn portion in the main panel in the flat state, a shape of the overlapped sewn portion in the first side panel in the flat state, and a shape of the overlapped sewn portion in the second side panel in the flat state are the same, and the first side panel in the flat state and the second side panel in the flat state have a same shape.

* * * * *